United States Patent Office 2,734,898
Patented Feb. 14, 1956

2,734,898
PRODUCTION OF HECOGENIN FROM PLANT MATERIAL

Robert Kenneth Callow, Philip Calvert Spensley, and John Warcup Cornforth, London, England, assignors to The National Research Development Corporation, London, England No Drawing. Application March 24, 1952, Serial No. 278,317

Claims priority, application Great Britain April 2, 1951

6 Claims. (Cl. 260—239.55)

This invention is for improvements in or relating to the production of hecogenin from plant material and may be applied particularly advantageously to portions of the plant *Agave sisalana*, or sisal. The leaves of sisal contain material which, after extraction and hydrolysis, yields hecogenin. The invention is applicable not only to the whole leaves, but also to "sisal waste," which is the material remaining after the leaves have been treated by the usual industrial process for separation of the useful fibres. Hecogenin is a known substance of the class of steroidal sapogenins and is of possible use in the preparation of hormones.

The production of hecogenin from plant material has been carried out in the past by processes involving the extraction of plant material by means of an alcoholic solvent followed by hydrolysis of the extracted material by means of mineral acid, whereafter the hydrolysed reaction mixture is extracted with a large volume of ether. After saponification with alcoholic potash, a sapogenin-rich fraction is obtained by a further extraction with ether.

The present invention has for an object to provide an improved process for the extraction and/or recovery of hecogenin from plants or plant material containing hecogenin or its precursors or derivatives and particularly plant material derived from the sisal plant, including such plant material as has already been processed for the extraction of other useful products, for example, pectates and waxes.

According to the present invention there is provided a process for the extraction and/or recovery of hecogenin from plants or plant material containing hecogenin or its precursors or derivatives which comprises saponifying the total water-insoluble solids recovered from the acid hydrolysis of an alcoholic extract of such plant or plant material by heating with caustic alkali in alcoholic solution, removing a substantial proportion of the alcohol in the reaction mixture, obtaining an aqueous suspension therefrom and recovering hecogenin from the aqueous suspension. The recovery of hecogenin from the aqueous suspension is preferably effected by treating it with an adsorbent, and extracting the adsorbent with a suitable organic solvent, e. g., ether, carbon tetrachloride, trichlorethylene, benzene and ethyl acetate, and recovering hecogenin from the extract. The replacement of the alcohol by water is preferably effected by steam distilling the reaction mixture to remove the alcohol therefrom.

According to a feature of the invention the hecogenin is recovered from the extract by crystallisation, residual material in the mother liquor being recovered either by further fractional crystallisation or by chromatography, for example on alumina.

The invention also includes a process for the production of hecogenin from such plant material which comprises extracting sisal leaves or sisal waste with a lower aliphatic alcohol, preferably methyl, or ethyl alcohol, containing from 0–50% by weight of water, adding a mineral acid to the extract, preferably to a concentration of from molar to twice molar, heating the acidified extract, preferably under reflux for a time sufficient to effect substantial hydrolysis of the extracted material, thereafter removing the alcohol in the reaction mixture by steam distillation and separating precipitated solids therefrom, saponifying the solid matter by heating with alcoholic caustic alkali, removing alcohol from the reaction mixture by steam distillation, adding an adsorbent to the hot aqueous suspension thus obtained, separating the adsorbent from the aqueous suspension and recovering hecogenin from said adsorbent by extraction with a solvent.

Following is a broad and general description of the process of the invention.

The dried sisal waste (or whole leaves of the sisal plant, dried and disintegrated) may first be de-fatted by percolation with light petroleum, ether or other suitable solvent, the plant material then being largely freed from the solvent employed. This defatting operation may, however, be omitted without serious effect on the success of the remainder of the extraction process.

The plant material is then extracted in a suitable apparatus by percolation or immersion in hot or cold methyl or ethyl alcohol containing from 0 to 50% of water. Other lower aliphatic alcohols may also be employed for the extraction. Where the extraction process continuously brings fresh alcohol into contact with the plant material (as in the Soxhlet apparatus) it is continued until the material is exhausted. Where the process does not so operate, it is repeated using fresh alcohol as many times as may be required to extract the plant material adequately.

The total alcoholic extract is then concentrated, if necessary, and mineral acid (e. g. hydrochloric acid) added. The amount of acid added is usually such as to give a solution of between molar and twice molar concentration but the concentration of the acid is not critical. The hydrolysis is then performed by heating the solution under the reflux for about 3 hours after which steam is blown into the solution until most of the alcohol has been displaced. The dark solid which is precipitated in this last operation is then collected, washed with water and dried.

The dark solid is now saponified by heating in alcoholic caustic alkali, the alcohol being afterwards removed in steam. Charcoal or other suitable adsorbent is added to the resulting aqueous suspension and, after thoroughly incorporating, is collected (by filtration or centrifugation), washed with water and dried.

The loaded adsorbent is now extracted with ether in a Soxhlet or other suitable apparatus, hecogenin crystallising out from the ether solution on cooling (after preliminary concentration if necessary). Evaporation of the mother liquor gives a gummy solid from which a further amount of hecogenin may be obtained by fractional crystallisation or chromatography on such an adsorbent as alumina.

Following is a description of one specific example illustrating the manner in which the invention may be carried into effect.

1 kg. of dried sisal waste was continuously extracted with hot methyl alcohol until it was exhausted. The alcoholic extract was then concentrated to about 1 litre and 200 cc. of concentrated hydrochloric acid added. The mixture was heated under reflux for 3 hours after which steam was blown in until the methyl alcohol had been removed. A dark solid was precipitated, which was collected, washed with water and dried. This solid was now dissolved in 250 cc. of hot ethyl alcohol and an equal volume of twice molar alcoholic sodium hydroxide solution added. After heating under reflux for 2 hours the alcohol was removed in steam and 50 g. of purified adsorbent activated charcoal added and well incorporated. The now loaded charcoal was collected by centrifuge from the hot solution, washed with water, dried and extracted with about 750 cc. of ether in a Soxhlet apparatus. After allowing the ether extract to cool and stand for some hours, 0.7 g. of hecogenin crystallised out. Concentration of the mother liquor to small bulk gave some 2.5 g. of colourless solid from which by chromatography on alumina a further 0.3 g. of pure hecogenin could be obtained.

The hecogenin was identified by its melting point (253–4° C.) and undepressed mixed melting point with a genuine specimen, also by its analysis, and the formation of various derivatives.

It will be appreciated from the foregoing that the amount of hecogenin that can be isolated is very small in comparison with the amount of raw vegetable material required. Sisal and other plants of the Agave genus are tropical or sub-tropical plants and it is desirable that at least part of the extraction process should be carried out in the areas where the plant material is produced in order to keep down the transport charges.

On the other hand the final stages of the process are preferably effected in an industrialised country, where the apparatus and the skill required for the final separation and purification of the hecogenin are more readily available.

For this reason therefore the part of the complete process for the production of hecogenin carried out in a sisal-growing area may be limited to the preparation of an aqueous suspension of hecogenin, which may be concentrated before transport. This suspension could be the result of removing alcohol either after the preliminary acid hydrolysis or after the saponification step.

The most practicable method of transporting the hecogenin at an intermediate stage of the process is in the form of the extract adsorbed on active charcoal, so that the steps down to the adsorption on active charcoal in the commercial exploitation of the invention would be carried out in the sisal-growing area and the remaining steps would probably be carried out elsewhere. The active charcoal with hecogenin adsorbed thereon is, in effect, a valuable intermediate product produced by the present invention, from which purified hecogenin may subsequently be obtained.

We claim:

1. A process for the extraction of hecogenin from plant material containing a substance from which hecogenin may be liberated by hydrolysis, which comprises saponifying the total water-insoluble solids recovered from the acid hydrolysis of an alcoholic extract of such plant material by heating with caustic alkali in alcoholic solution, removing a substantial proportion of the alcohol in the reaction mixture by subjecting the latter to steam distillation, and recovering hecogenin from the resultant aqueous suspension by adsorption on activated charcoal, drying said activated charcoal and extracting hecogenin therefrom by means of a solvent.

2. A process for the production of hecogenin which comprises extracting plant material containing a substance from which hecogenin may be liberated by hydrolysis with a lower aliphatic alcohol, adding a mineral acid to the extract, heating the acidified extract for a time sufficient to effect substantial hydrolysis of the extracted material, thereafter removing the alcohol in the reaction mixture by steam-distillation and separating precipitated solids therefrom, saponifying the solid matter by heating with alcoholic caustic alkali, removing alcohol from the reaction mixture by steam-distillation, adding activated charcoal to the hot aqueous suspension thus obtained, separating the activated charcoal from the aqueous suspension and recovering hecogenin from said activated charcoal by extraction with a solvent.

3. A process for the production of hecogenin which comprises extracting plant material containing a substance from which hecogenin may be liberated by hydrolysis with aqueous lower aliphatic alcohol containing 0–50% water, adding a mineral acid to the extract, heating the acidified extract for a time sufficient to effect substantial hydrolysis of the extracted material, thereafter removing the alcohol in the reaction mixture by steam-distillation and separating precipitated solids therefrom, saponifying the solid matter by heating with alcoholic caustic alkali, removing alcohol from the reaction mixture by steam-distillation, adding activated charcoal to the hot aqueous suspension thus obtained, separating the activated charcoal from the aqueous suspension and recovering hecogenin from said activated charcoal by extraction with a solvent.

4. A process for the production of hecogenin which comprises extracting plant material containing a substance from which hecogenin may be liberated by hydrolysis with a lower aliphatic alcohol, adding a mineral acid of concentration of from molar to twice molar to the extract, heating the acidified extract for a time sufficient to effect substantial hydrolysis of the extracted material, thereafter removing the alcohol in the reaction mixture by steam-distillation and separating precipitated solids therefrom, saponifying the solid matter by heating with alcoholic caustic alkali, removing alcohol from the reaction mixture by steam-distillation, adding activated charcoal to the hot aqueous suspension thus obtained, separating the activated charcoal from the aqueous suspension and recovering hecogenin from said activated charcoal by extraction with a solvent.

5. A process for the production of a hecogenin concentrate comprising extracting plant material containing a substance from which hecogenin may be liberated by hydrolysis, with lower aliphatic alcohol, adding a mineral acid to the extract, heating the acidified extract for a time sufficient to effect substantial hydrolysis of the extracted material, thereafter removing a substantial proportion of the alcohol, separating precipitated solids, saponifying said solids by heating with alcoholic caustic alkali, removing alcohol from the reaction mixture, thereby obtaining an aqueous suspension of solids and adsorbing said solids on activated charcoal.

6. A hecogenin concentrate comprising activated charcoal with hecogenin collected thereon to the extent of at least 2% by weight of the activated charcoal.

References Cited in the file of this patent

UNITED STATES PATENTS

| | | |
|---|---|---|
| Re. 23,008 | Wagner | June 15, 1948 |
| 2,359,443 | Schivek | Oct. 3, 1944 |
| 2,408,834 | Wagner | Oct. 8, 1946 |

OTHER REFERENCES

Marker: J. Am. Chem. Soc., June 1943, p. 1199.